United States Patent [19]

Leblanc

[11] 3,931,119

[45] Jan. 6, 1976

[54] AROMATIC CARBOXAMIDE-SULPHONAMIDE POLYCONDENSATES

[75] Inventor: Jean-Claude Leblanc, Venissieux,, France

[73] Assignee: Rhone-Poulenc S.A., Paris, France

[22] Filed: Sept. 10, 1973

[21] Appl. No.: 395,435

[30] Foreign Application Priority Data
Sept. 13, 1972  France .............................. 72.32426

[52] U.S. Cl. ......... 260/78 R; 260/30.2; 260/30.6 R; 260/32.6 NA; 260/78 S
[51] Int. Cl.² ......................................... C08G 69/32
[58] Field of Search ................................... 260/78 R

[56] References Cited
UNITED STATES PATENTS
3,354,125  11/1967  Smith et al. ...................... 260/78 R 3,786,024  1/1974  Wolf et al. ........................ 260/78 R

*Primary Examiner*—Harold D. Anderson
*Attorney, Agent, or Firm*—Stevens, Davis, Miller & Mosher

[57] ABSTRACT

New aromatic polyamide-sulphonamides consisting essentially of recurring units of the formula:

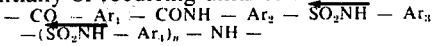

$-(SO_2NH - Ar_1)_n - NH -$ in which each of the Ar radicals, which may be identical or different, represents a divalent aromatic radical containing one or more benzene rings, $n$ is 0 or an integer equal to or greater than 1 and the arrow above the $-SO_2NH-$ groups indicates that these groups can be reversed to give $-NHSO_2-$ groups.

These new polymers are infusible products which are resistant to high temperatures and which can be converted into yarns and films.

4 Claims, No Drawings

AROMATIC CARBOXAMIDE-SULPHONAMIDE POLYCONDENSATES

The present invention relates to new aromatic polycondensates containing carboxamide and sulphonamide groups.

Polymers which simultaneously contain carboxamide and sulphonamide chains have been mentioned in French Pat. No. 865,455, but there is no suggestion that they have been prepared. According to this patent, using carboxylic diacids, sulphonic diacids and diamines as starting materials, it is possible to obtain polycarboxamide-sulphonamides which can be used to prepare films and filaments and which, for this purpose, must be fusible or soluble in organic solvents. More recently, polycondensates prepared from para-chlorosulphonylbenzoic acid chloride and aliphatic diamines have been described (in British Patent Specification No. 986,356). These products, of high melting point, are not readily soluble in organic solvents such as dimethylformamide unless an inorganic salt such as lithium chloride is added. It is then necessary to subject the films or yarns prepared from such solutions to a series of acid washings followed by washings with water in order to remove all traces of metallic salts which have a detrimental effect on the properties and storage of the films and yarns.

The present invention relates to polycarboxamide-sulphonamides which are infusible, and are soluble in organic solvents at high concentrations without it being necessary to add inorganic salts. These polymers consist essentially of recurring units of the formula:

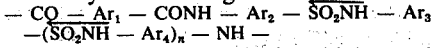

in which each of the Ar radicals, which may be identical or different, represents a divalent aromatic radical containing one or more benzene rings, $n$ is 0 or an integer equal to or greater than 1. The arrow above the $-SO_2NH-$ groups signifies that each of these groups can be reversed to give $-NHSO_2-$ groups.

The present invention relates, in particular, to the polymers in which $n$ is equal to 0 or to 1, that is to say polymers in which the ratio between the number of carboxamide units and sulphonamide units is 2:1 or 1:1.

The aromatic diacids of formula $HOOC - Ar_1 - COOH$ which can be used to prepare these products can be, for example, terephthalic acid, isophthalic acid, a dicarboxydiphenyl acid, a dicarboxynaphthalene, a dicarboxydiphenylmethane, a dicarboxydiphenyl ether or a dicarboxydiphenyl thioether.

The diamines which can be used have the formula:
$H_2N - Ar_2 - SO_2NH - Ar_3 -(SO_2NH - Ar_4)_n - NH_2$.

These amines can be synthesised by known methods, for example by reacting an aromatic diamine with an amino-arylsulphonic acid or its chloride according to the equation:

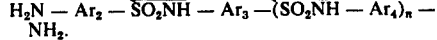

, or by reacting a disulphonic acid dichloride with an aromatic diamine according to the equation

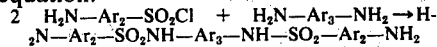

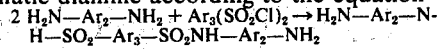

Polycondensation of the diacid or of its chloride with the diamines can be carried out in accordance with the usual methods for the preparation of polyamides, for example in solution in a polar organic solvent such as dimethylacetamide, hexamethylphosphotriamide or N-methylpyrrolidine. The reaction can be carried out at ambient temperature but it can be accelerated by heating. Isolation of the polymer can be carried out by pouring the reaction mixture into water, preferably with vigorous stirring; the polymer usually precipitates in the form of granules from which all traces of acidity can be removed by washing with water.

The polymers thus obtained are infusible products which are resistant to temperatures as high as 350°-450°C; they can be dissolved, at concentrations which can be as much as 40 percent, in organic solvents such as aliphatic or cyclic amides like dimethylformamide, dimethylacetamide, N-methylpyrrolidone and mixtures thereof. Their solutions are transparent and can be cast or extruded in order to prepare infusible films and fibres which are resistant to heat and possess good mechanical properties, in particular high tensile strength and a high modulus.

The following Examples further illustrate the present invention.

EXAMPLE 1

7.89 g. of 4,4'-diamino-benzene-sulphanilide are introduced into a reactor equipped with a scraping stirrer and are dissolved in 70 cm³ of dimethylacetamide. The mixture is then cooled to 10°C., and 6.09 g. of terephthaloyl chloride are added with stirring. The mixture is kept at 25°–30°C. for 4 hours. The viscous and translucent reaction mixture is then poured into 1,000 cm³ of water, stirring vigorously. The product which has thus precipitated is washed with water and then with acetone and dried by heating at 80°–100°C./1 mm.Hg for 4 hours. The polymer is then in the form of infusible whitish granules which are soluble at ambient temperature in various solvents such as dimethylformamide, dimethylacetamide, N-methylpyrrolidone and hexamethylphosphotriamide. A 20 percent strength solution in dimethylacetamide has a viscosity of 350 poises.

This polymer of the formula:

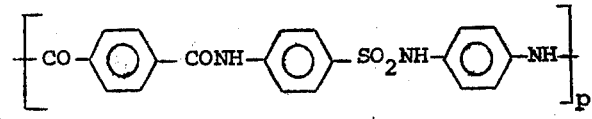

has an average molecular weight, determined by light diffusion, of 140,000 and its inherent viscosity, measured at 25°C. using a solution of 0.5 g. of product in 100 cm³ of dimethylacetamide, is 1.3 dl/g. The heat resistance of this product is assessed by thermogravimetric analysis in air and under nitrogen; at 350°C. the product has not undergone any degradation.

EXAMPLE 2

Following the procedure of the preceding Example, 7.89 g. of the same diamine dissolved in 100 cm³ of dimethylacetamide are reacted with 8.37 g. of 4,4'-dicarboxydiphenyl acid dichloride. A white granular polymer of the formula:

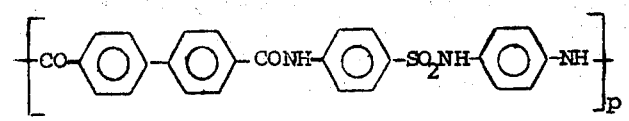

is thus obtained, the inherent viscosity of which, determined as in Example 1, is 1.15 dl/g. This product dissolves easily in dimethylacetamide, at ambient temperature; a 20 percent strength solution is translucent and stable; the solution has an apparent viscosity of 310 poises at 25°C., which is retained after being stored for 48 hours.

EXAMPLE 3

Following the procedure of Example 1, 11.25 g. of 1,4-di-(p-aminophenylsulphonamido)-benzene are dissolved in 67 g. of a 75/25 mixture of dimethylacetamide and hexamethylphosphotriamide. 5.64 g. of terephthaloyl chloride are added and the reaction is allowed to continue at 25°C. for 4 hours 30 minutes with stirring.

The polymer obtained, of the formula:

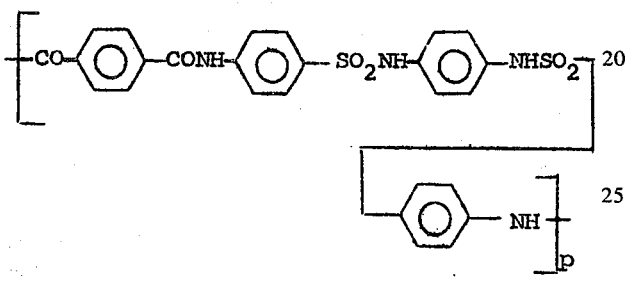

has an average molecular weight of 87,000 and an inherent viscosity of 1.4 dl/g. (determined at 25°C., using a solution of 0.5 g. of product in an 80/20 mixture of dimethylacetamide and hexamethylphosphotriamide). It dissolves at ambient temperature in polar solvents. Thus it is possible to prepare 15 percent strength solutions in a 50/50 mixture of hexamethylphosphotriamide and dimethylacetamide, which can be used for spinning or casting films.

EXAMPLE 4

Starting from 9.52 g. of the diamine used in the preceding Example, dissolved in 63.5 g. of an 80/20 mixture of dimethylacetamide and hexamethylphosphotriamide, and 6.35 g. of 4,4'-dicarboxy-diphenyl acid dichloride, a polymer of the formula:

is prepared, the inherent viscosity of which, determined as in Example 1, is 1.37 dl/g. With this polymer, it is possible to prepare 15 percent strength solutions at ambient temperature in an 80/20 solvent mixture of dimethylacetamide and hexamethylphosphotriamide.

EXAMPLE 5

A solution of 7.4 g. of 4,4'-di-(p-aminophenylsulphamoyl)-diphenyl in 60 cm³ of dimethylacetamide is prepared, to which 3.04 g. of terephthaloyl chloride are added. Following the procedure in the preceding Examples, a polymer of the formula:

is obtained which has a viscosity of 0.3 dl/g., determined at 25°C. using a solution containing 0.5 percent of polymer in dimethylacetamide.

EXAMPLE 6

Starting from a solution of 4.94 g. of diphenyl 4,4'-di-(p-aminophenylsulphonamides) in 35 cm³ of dimethylacetamide and 2.79 g. of 4,4'-dicarboxy-diphenyl acid dichloride, a polymer of the formula:

is prepared, the inherent viscosity of which, determined as in Example 5, is 0.73 dl/g.

This polymer is infusible and resists temperatures of 300°–350°C., in air or in an inert atmosphere, without degradation. A solution in dimethylacetamide with a solids content of 15 percent is suitable for casting films.

EXAMPLE 7

Following the procedure of Example 6, but replacing the 4,4'-dicarboxy-diphenyl acid dichloride by terephthaloyl chloride, the polymer of the formula:

is prepared, which has an inherent viscosity, determined as in Example 5, of 0.66 dl/g., and which is infusible and resists temperatures of 300°–350°C. without degradation.

EXAMPLE 8

A 20 percent strength solution in dimethylacetamide of a polymer prepared according to Example 1, the inherent viscosity of which is 1.15 dl/g., is prepared by stirring at ambient temperature.

This solution is then concentrated to 32 percent by evaporation at 110°C./160 mm.Hg, and is then passed through a spinneret heated at 114°C. The fibre produced passes through a column heated at 180°C., whilst being pulled at the rate of 25 m/minute, and is then taken up continuously in water and dried on a roller at 75°C. It is then partially stretched (ratio 2:1) before being stretched finally at a ratio of 1.6:1 above a plate heated at 350°C.

The yarns thus produced have the following properties:

| | |
|---|---|
| Gauge | : 13.5 dtex |
| Tenacity | : 4 g. dtex |
| Elongation at break | : 5% |
| Initial modulus | : 150 g. dtex |

I claim:

1. A heat-resistant film- or fibre-forming aromatic polyamide-sulphonamide consisting essentially of recurring units of the formula:

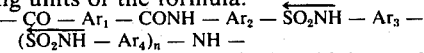

$$-(SO_2NH - Ar_4)_n - NH -$$

in which each of the Ar radicals, which may be identical or different, represents

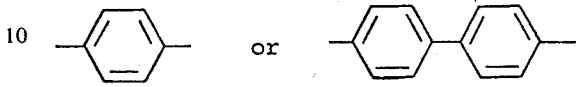

$n$ is 0 or an integer at least equal to 1 and the arrow above $-SO_2NH-$ groups indicates that each of these groups can be reversed to give $-NH-SO_2-$ groups, said polyamide-sulphonamide being resistant to temperatures as high as 350° to 450°C. and soluble in organic solvents without it being necessary to add inorganic salt.

2. A polyamide-sulphonamide according to claim 1, in which $n$ is 0 or 1.

3. A polyamide-sulphonamide according to claim 1, in the form of a fibre or film.

4. A method of preparing a fibre or film which comprises casting or extruding a solution of a polyamide-sulphonamide as defined in claim 1 in a polar organic solvent.

* * * * *